(12) United States Patent
Zhao

(10) Patent No.: US 10,591,384 B2
(45) Date of Patent: Mar. 17, 2020

(54) SUPPORT STRUCTURE FOR AN OPTICAL TIME DOMAIN REFLECTOMETER AND AN OPTICAL TIME DOMAIN REFLECTOMETER

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, WeiHai (CN)

( * ) Notice: Subject to any disclaimer, the term of this patent is extended or adjusted under 35 U.S.C. 154(b) by 218 days.

(21) Appl. No.: 15/856,856

(22) Filed: Dec. 28, 2017

(65) Prior Publication Data
US 2019/0017897 A1 Jan. 17, 2019

(30) Foreign Application Priority Data
Jul. 14, 2017 (CN) .......................... 2017 1 0575321

(51) Int. Cl.
*G01M 11/00* (2006.01)
*F16M 11/38* (2006.01)
*G02B 6/46* (2006.01)

(52) U.S. Cl.
CPC ........ *G01M 11/3109* (2013.01); *F16M 11/38* (2013.01); *G02B 6/46* (2013.01)

(58) Field of Classification Search
CPC . G01M 11/3109; F16M 11/38; H05K 5/0234; H05K 5/02; H05K 5/00; H05K 5/0086
See application file for complete search history.

(56) References Cited

U.S. PATENT DOCUMENTS

2016/0088750 A1* 3/2016 Wu ........................ F16M 11/10

* cited by examiner

*Primary Examiner* — Georgia Y Epps
*Assistant Examiner* — Don J Williams
(74) *Attorney, Agent, or Firm* — Anova Law Group, PLLC

(57) ABSTRACT

The present invention relates to a support structure for an optical time domain reflectometer and an optical time domain reflectometer containing such structure comprises a rear housing and a support portion, among which, the support portion comprises a cover support plate and an inner support plate; the cover support plate is connected to the rear housing through a cover rotating shaft portion, and the inner support plate is connected to the cover support plate through an inner plate rotating shaft portion; the surface area of the inner support plate is smaller than that of the cover support plate. The invention can solve the shortcoming of the instability of the support of existing optical time domain reflectometers, and provide a support structure for an optical time domain reflectometer having low cost, stable structure, and that can automatically open the support, as well as an optical time domain reflectometer used with this support structure.

12 Claims, 5 Drawing Sheets

SUPPORT STRUCTURE FOR AN OPTICAL TIME DOMAIN REFLECTOMETER AND AN OPTICAL TIME DOMAIN REFLECTOMETER

CROSS-REFERENCE TO RELATED APPLICATIONS

This application claims the priority of Chinese Patent Application No. 201710575321.8, filed on Jul. 14, 2017, the content of which is incorporated herein by reference in its entirety.

TECHNICAL FIELD

The present invention relates to the field of cable construction and maintenance equipment, and in particular, to a support structure for an optical time domain reflectometer and an optical time domain reflectometer comprising the same.

BACKGROUND

An optical time domain reflectometer is a kind of instrument by analyzing the measurement curve to understand the fiber uniformity, defects, fracture, joint coupling and other performance. It is commonly used to analyze the test curve in the construction and maintenance of fiber optic cables, quickly measure the length of fiber and the loss of fiber circuit so as to keep abreast of the transmission of optical fiber and identify the fiber drawbacks and hidden troubles, in order to provide reliable guarantee for the construction and maintenance of radio and television cables.

At present, the common optical time domain reflectometer is divided into two types, i.e. with or without support structure. The support structure can facilitate personnel to better observe data during operation, which conforms to the ergonomic principles. For the optical time domain reflectometer provided with a support structure, its support structure is mostly a fulcrum support, that is to say, a pullable plate can be provided on the rear housing. This structure requires a great strength of the fulcrum and the support is unstable, subject to frequent broken fulcrum during the actual use because of harsh operating environment resulting in adverse consequences to the overall use.

SUMMARY

The problem to be solved by the present invention is to solve the above-mentioned drawbacks of the prior art, to provide a support structure for an optical time domain reflectometer having low cost, stable structure, and that can automatically open the support, as well as an optical time domain reflectometer used with this support structure.

The technical problems of the invention can be solved by the following technical proposals:

A support structure for an optical time domain reflectometer comprises a rear housing and a support portion, and the support portion comprises a cover support plate and an inner support plate.

The cover support plate is connected to the rear housing through a cover rotating shaft portion, and the inner support plate is connected to the cover support plate or the rear housing through an inner plate rotating shaft portion, and the rear housing with the cover support plate and the inner support plate form a solid triangular support structure.

Further, the cover rotating shaft portion and the inner plate rotating shaft portion are provided on the cover support plate and/or the rear housing, and the cover rotating shaft portion is parallel to the inner plate rotating shaft portion.

Further, the cover rotating shaft portion comprises a cover rotating shaft and a cover rotating shaft spring, among which, one end of the cover rotating shaft spring comes in contact with the rear housing, while the other end comes in contact with the cover support plate; the inner plate rotating shaft portion comprises an inner plate rotating shaft, an inner plate rotating shaft spring, an inner plate rotating shaft inner sleeve, and an inner plate shaft outer sleeve, among which, one end of the inner plate rotating shaft spring comes in contact with the cover support plate or the rear housing, while the other end comes in contact with the inner support plate, and the inner plate rotating shaft inner sleeve is provided on the inner support plate, the inner plate rotating shaft outer sleeve is provided on the cover support plate or the rear housing, and the inner plate rotating shaft goes through the inner plate rotating shaft inner sleeve and the inner plate rotating shaft outer sleeve.

Further, the inner plate rotating shaft portion also comprises an inner plate boss provided at one side of the inner rotating shaft inner sleeve and a cover boss provided at one side of the inner rotating shaft outer sleeve. When the inner support plate is opened, the inner plate boss is brought into contact with the cover boss so that the angle between the inner support plate and the cover support plate, or between the inner support plate and the rear housing is less than 90°.

Further, the natural state of the cover rotating shaft spring is a tightened state in which the direction of contracting force is to bring the cover support plate into close contact with the rear housing, and the natural state of the inner plate rotating shaft spring is an open state in which the direction of tension is to bring the inner support plate away from the cover support plate or the rear housing.

Further, the cover rotating shaft portion also comprises a cover spring stop provided on the cover support plate and a rear housing spring stop provided on the rear housing, and the cover spring stop and the rear housing spring stop are used to accommodate the cover rotating shaft spring;

Further, the inner plate rotating shaft portion also comprises an inner plate spring stop provided on the inner support plate and protruding the inner support plate, and an inner plate spring accommodation stop provided on the cover support plate or the rear housing and recessed in the cover support plate or the rear housing;

preferably, the inner plate rotating shaft penetrates through the inner plate rotating shaft spring.

Further, the rear housing is provided with a support accommodation point recessed in the rear housing, when the support structure is opened, the support accommodation point is used to accommodate one end of the inner support plate.

Further, the cover support plate and the rear housing are respectively provided with a snap-fit stop and/or a snap-fit stop boss, when the support portion is engaged with the rear housing, the snap-fit stop will be caught with the snap-fit stop boss.

Further, the cover support plate is provided with a cover side boss, when the support portion is engaged with the rear housing, the cover side boss will be integrated closely with the support accommodation point.

Further, the cover support plate is externally provided with a non-slip portion.

Further, the inner support plate is provided with a plurality of reinforcing ribs.

The present invention also provides an optical time domain reflectometer provided with a support structure, wherein the support structure is a support structure for the above-mentioned optical time domain reflectometer.

The beneficial effects of the present invention are:

1. The support structure adopted by the invention has strong support and is less prone to be damaged during use, and can resist the external impact of considerable strength.

2. The support structure adopted by the invention adopts the automatic opening method, which can automatically reach the designated position, being convenient and simple, and easy to operate.

3. The invention has the advantages of simple structure and low processing cost, which effectively achieves the goal of reducing the product cost.

REFERENCE NUMBERS IN THE FIGURE

| | |
|---|---|
| 1 | Rear housing |
| 11 | Snap-fit stop boss |
| 12 | Support accommodation point |
| 2 | Support portion |
| 21 | Cover support plate |
| 211 | Cover side boss |
| 22 | Inner support plate |
| 3 | Cover rotating shaft portion |
| 31 | Cover rotating shaft |
| 32 | Cover rotating shaft spring |
| 33 | Cover spring stop |
| 34 | Rear housing spring stop |
| 35 | Cover boss |
| 321 | Bending portion |
| 322 | Middle portion |
| 323 | Vertical portion |
| 4 | Inner plate rotating shaft portion |
| 41 | Inner plate rotating shaft |
| 42 | Inner plate rotating shaft spring |
| 43 | Inner plate spring stop |
| 44 | Inner plate spring accommodation stop |
| 45 | Inner plate rotating shaft inner sleeve |
| 46 | Inner plate rotating shaft outer sleeve |
| 47 | Inner plate boss |
| 5 | Snap-fit stop |
| 6 | Non-slip portion |
| 7 | Reinforcing rib |

DETAILED DESCRIPTION OF EMBODIMENTS

Hereinafter, the present invention will be described further with reference to the preferred embodiments and with reference to the accompanying drawings.

Embodiment 1

Figure 1:
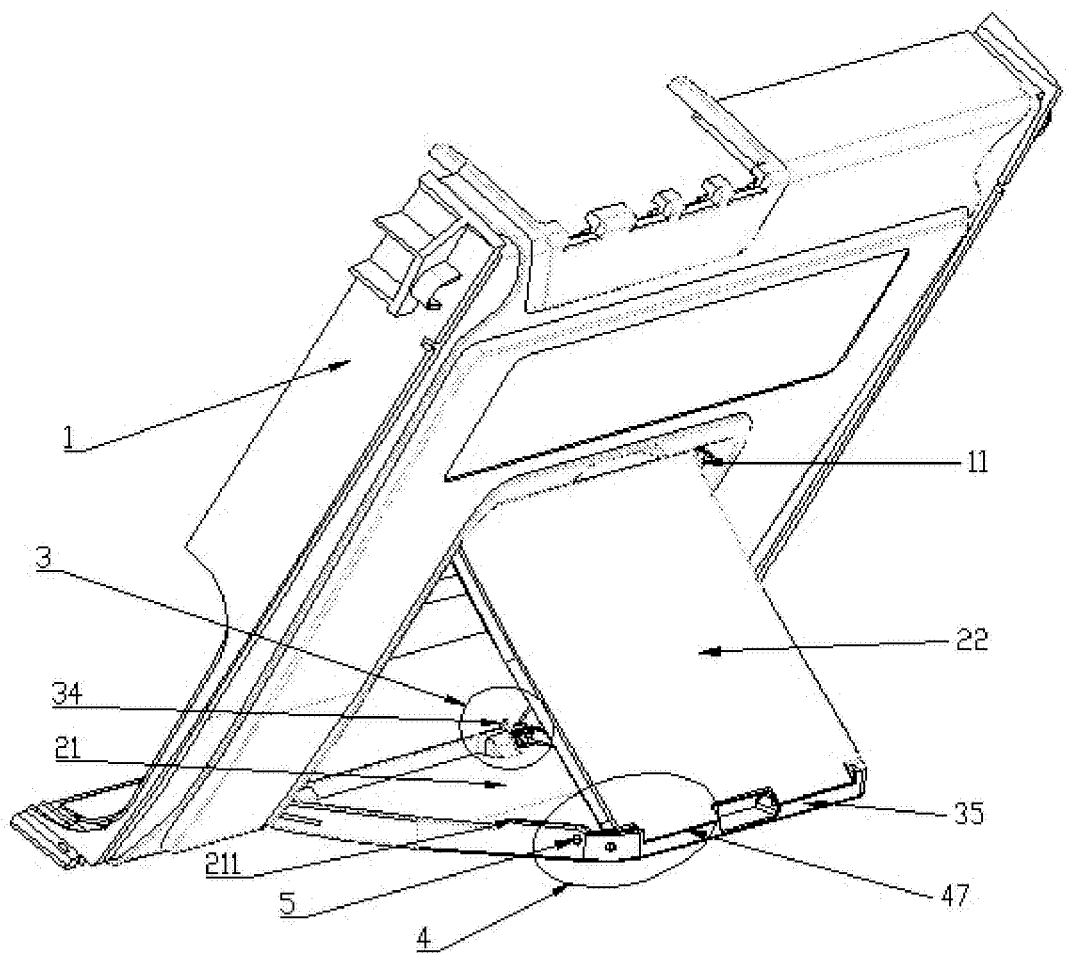
FIG. 1 is a schematic view showing the support structure of the optical time domain reflectometer according to the present invention.
Figure 2:
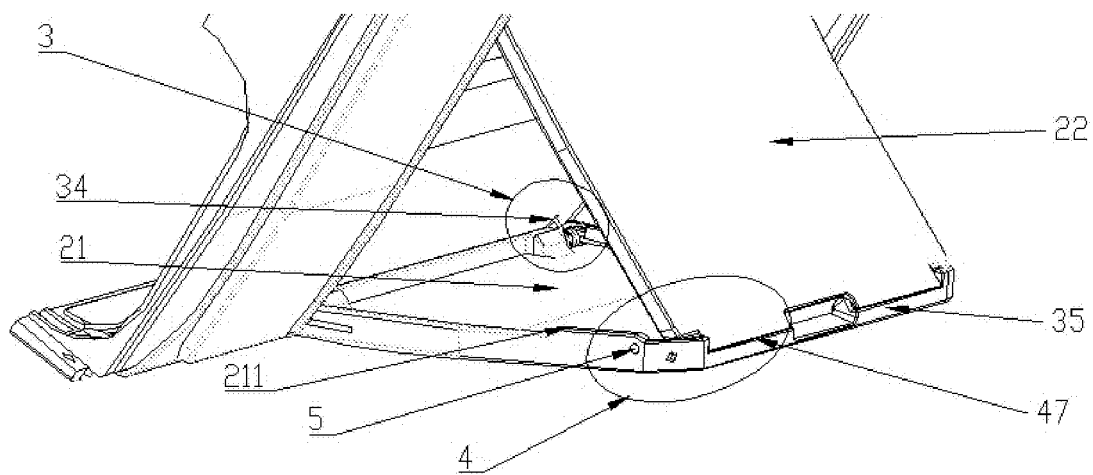
FIG. 2 is a partial enlarged structure drawing of the support structure as shown in FIG. 1.
Figure 3:
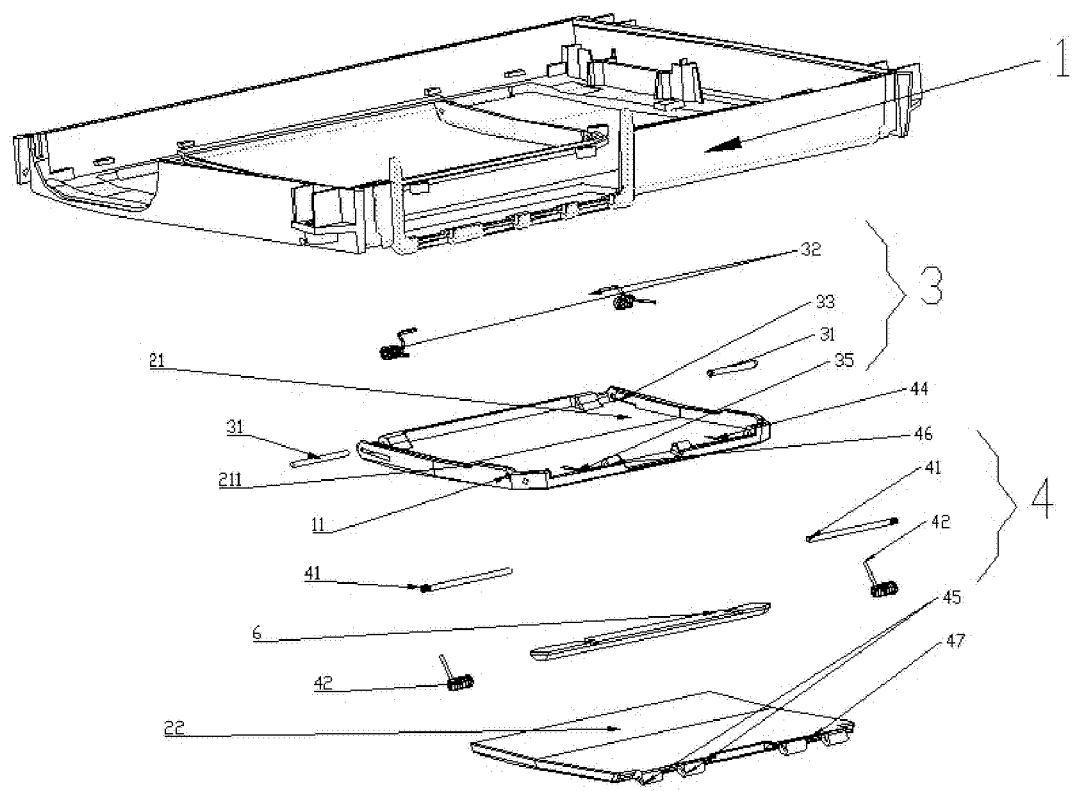
FIG. 3 is an exploded view showing the overall structure of the support structure of the optical time domain reflectometer according to the present invention.
Figure 4:
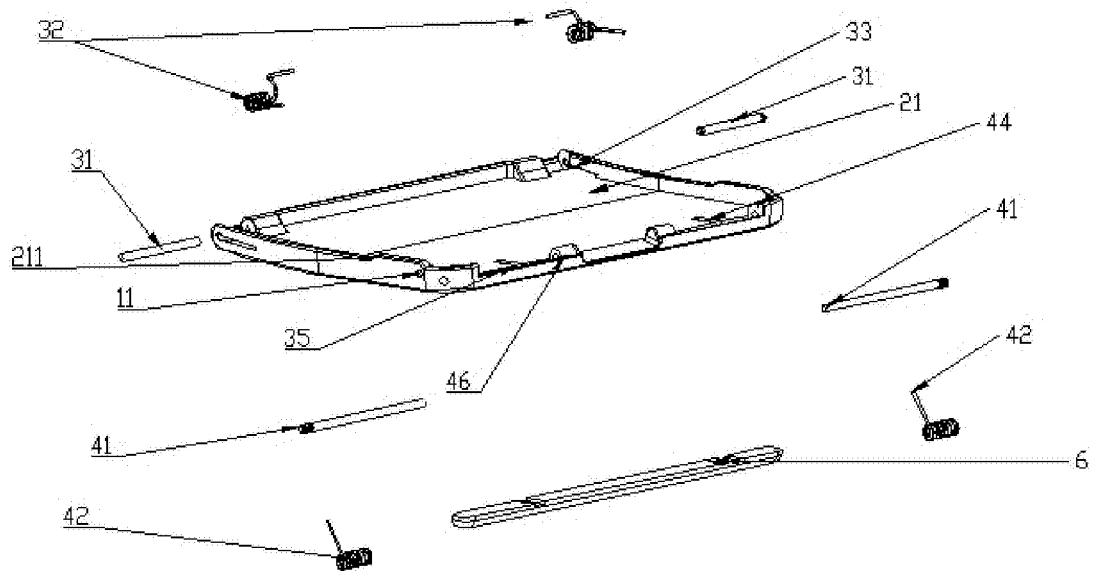
FIG. 4 is a partial enlarged structure drawing of FIG. 3.
Figure 5:
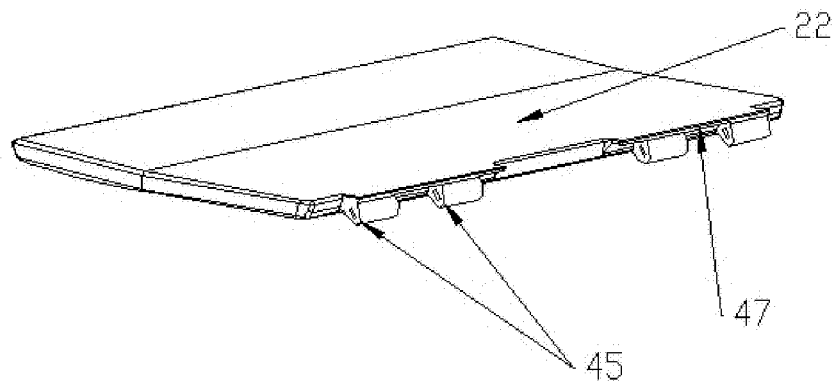
FIG. 5 is another partial enlarged structure drawing of FIG. 3.
Figure 6:
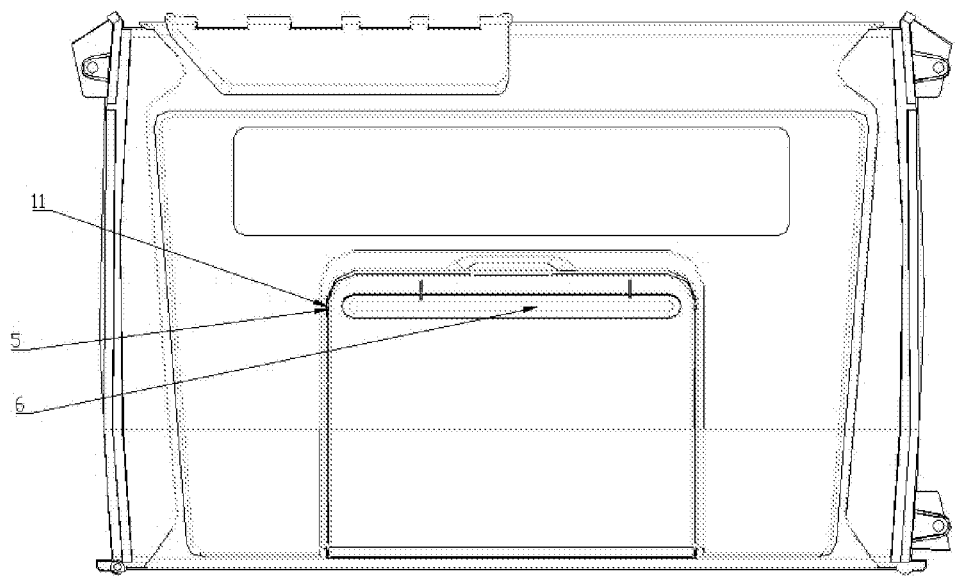
FIG. 6 is a schematic view showing the effect of the snap-fit state of the support structure according to the present invention.

As shown in FIGS. 1, 2, and 6, a support structure for an optical time domain reflectometer disclosed in the present invention which is located at the back of the optical time domain reflectometer and comprises a rear housing 1 and a support portion 2, and the support portion 2 comprises a cover support plate 21 and an inner support plate 22; the rear housing 1 with the cover support plate 21 and the inner support plate 22 forms a solid triangular support structure. That is, in the triangular support structure, the rear housing 1, the cover support plate 21 and the inner support plate 22 are three sides of a triangle, and are mutually supported, and the support structure formed is very stable. It is different from the structure supported by two rods or two sides in the prior art, without need to use an outer plane as one side of the support structure, and the three sides of the support structure itself of the invention form a solid support without being restricted by the operating environment. Preferably, the surface area of the inner support plate 22 is smaller than that of the cover support plate 21, and the inner support plate 22 is engaged inside by the cover support plate 21 when the entire support structure is engaged.

As shown in FIGS. 1 through 5, the cover support plate 21 is connected to the rear housing 1 through a cover rotating shaft portion 3, and the inner support plate 22 is connected to the cover support plate 21 through an inner plate rotating shaft portion 4; the cover rotating shaft portion 3 and the inner plate rotating shaft portion 4 are provided on the cover support plate 21, and the cover rotating shaft portion is parallel to the inner plate rotating shaft portion. Specifically, the inner plate rotating shaft portion 4 may either be provided on the side of the cover support plate 21, or be provided inside the cover support plate 21 at a position where the supporting effect and the support structure are not affected. Preferably, the inner plate rotating shaft portion 4 is provided on the side of the cover support plate 21 opposite to the cover rotating shaft portion 3 at which time the three sides of the cover support plate 21, the inner support plate 22, and the rear housing 1 are mutually connected to form a triangular support.

Preferably, in the present embodiment, the cover rotating shaft portion 3 comprises a cover rotating shaft 31, a cover rotating shaft spring 32, a cover spring stop 33, and a rear housing spring stop 34. The cover rotating shaft 31 penetrates the cover rotating shaft spring 32, one end of which is in contact with the rear housing 1 and the other end thereof is in contact with the cover support plate 21, and the cover spring stop 33 is a hole site allowing and restricting the connection position of the cover rotating shaft spring 32, the rear housing spring stop 34 is located on the rear housing 1 and is an access hole through which the cover rotating shaft spring 32 can pass. Specifically, one side of the cover rotating shaft spring 32 is connected to the rear housing 1 through the rear housing spring stop 34 and the other side is connected to the cover support plate 21 through the cover spring stop 33. At this time, the rear housing 1 and the cover support plate 21 can be brought close to or away from each other by the elastic elongation of the cover rotating shaft spring 32.

The direction of the force of the cover rotating shaft spring 32 can be divided into two types depending on its setting direction: The cover support plate 21 is brought close to the rear housing 1 or away from the rear housing 1. In the present embodiment, it is preferable that the natural state of the cover rotating shaft spring 32 is a tightened state in which the direction of contracting force is: to bring the cover support plate 21 into close contact with the rear housing 1. On the other hand, it is understood that the natural state of the cover rotating shaft spring 32 may be an open state, that is, the cover support plate 21 is brought away from the rear housing 1. In the following, only the natural state of the preferred cover rotating shaft spring 32 in a tightening state is described as an example, and the reverse is also within the scope of the present invention, and will not be described here.

Figure 9:
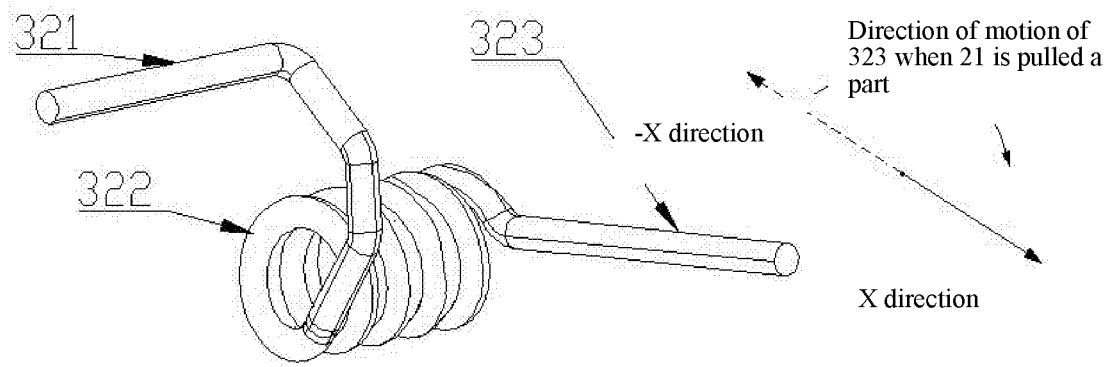
FIG. 9 is a schematic view showing the cover rotating shaft spring of the support structure of the optical time domain reflectometer according to the present invention.
Figure 10:
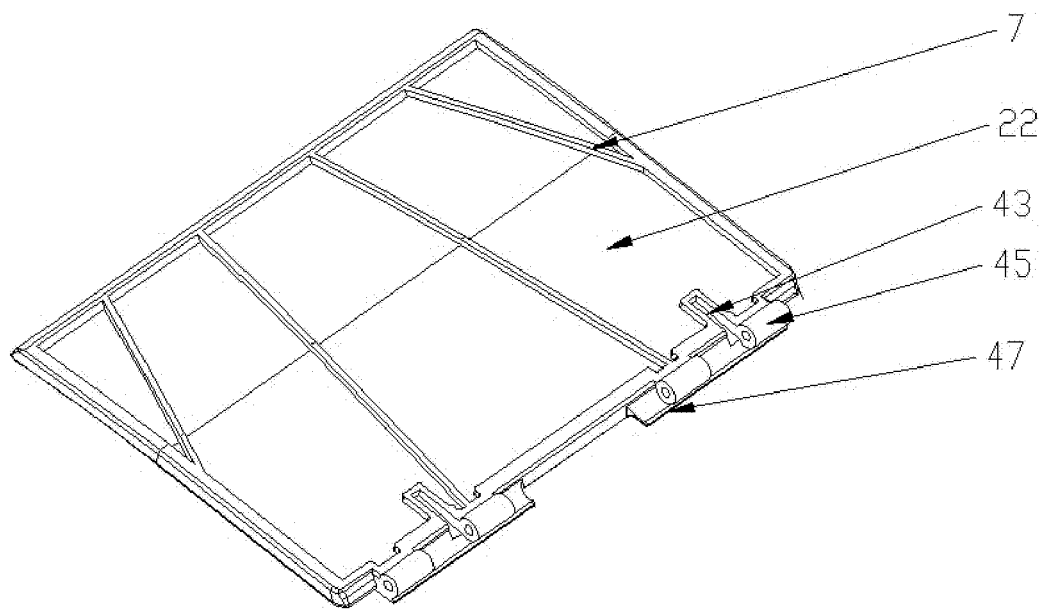
FIG. 10 is a schematic view showing the inner support plate structure of the optical time domain reflectometer according to the present invention.

As shown in FIG. 9, the X direction is set so that the cover support plate 21 is brought away from the rear housing 1, and the −X direction is set so that the cover support plate 21 is brought close to the rear housing 1. The state as shown in FIG. 9 is the one in which the support structure of the present invention is opened, the cover support plate 21 is brought away from the rear housing 1. The natural state of the cover rotating shaft spring 32 is a tightened state in which the direction of contracting force is to bring the cover support plate 21 into close contact with the rear housing 1. Specifically, the cover rotating shaft spring 32 comprises three portions, i.e. a bending portion 321, a middle portion 322, and a vertical portion 323, among which, the bending portion 32 is connected to the rear housing 1 through the rear housing elastic stop 34, the vertical portion 323 is connected to the cover support plate 21 through the cover spring stop 33, and the bending portion 321 is an extension of the spring rib when the natural tension direction is X direction, and is deformed into the −X direction shown in FIG. 9 (i.e., the direction opposite to X direction) so as to cause the entire cover rotating shaft spring 32 to generate a contracting force in −X direction so that the cover support plate 21 is brought into close contact with the rear housing 1. When the support structure is opened, that is, the cover support plate 21 is pulled away, the vertical portion 323 will move towards X direction, and the vertical portion 323 maintains the contracting force in −X direction in this full course.

As shown in FIGS. 1 to 5 and FIG. 10, the inner plate rotating shaft portion 4 preferably comprises an inner plate rotating shaft 41, an inner plate rotating shaft spring 42, an inner plate spring stop 43, an inner plate spring accommodation stop 44, an inner plate rotating shaft inner sleeve 45, an inner plate rotating shaft outer sleeve 46, an inner plate boss 47 and a cover boss 35.

The inner plate rotating shaft 41 connects the inner plate support plate 22 and the cover support plate 21, and the inner plate rotating shaft inner sleeve 45 is provided on the inner plate support plate 22, and the inner plate rotating shaft outer sleeve 46 is provided on the cover support plate 21, and the inner plate rotating shaft 41 connects the inner support plate 22 and the cover support plate 21 through the inner plate rotating shaft inner sleeve 45 and the inner plate rotating shaft outer sleeve 46.

The inner plate rotating shaft spring 42 is wrapped around the outer circumference of the inner plate rotating shaft 41 with one end thereof in contact with the cover support plate 21 and the other end thereof in contact with the inner support plate 22, among which, the inner plate spring stop 43 is provided on the inner support plate 22 and protrudes the inner support plate 22, and the inner plate spring accommodation stop 44 is provided on the cover support plate 21 and recessed on the cover support plate 21, and specifically, one end of the inner plate rotating shaft spring 42 falls into the inner plate spring stop 43 and the other end falls into the inner plate spring accommodation stop 44, and the natural state of the inner plate rotating shaft spring 42 is an open state with the tension direction to bring the inner support plate 22 away from the cover support plate 21, that is, the inner plate rotating spring 42 distracts the cover support plate 21 and the inner support plate 22 so that when the cover support plate 21 is opened and no force is applied to press the inner support plate 22 against the cover support plate 22, the inner support plate 22 will automatically open and one end thereof will be separated from the cover support plate 21.

The inner plate boss 47 is provided on one side of the inner plate rotating shaft inner sleeve 45, and the cover boss 35 is provided on one side of the inner plate rotating shaft outer sleeve 46. Specifically, the inner plate boss 47 and the cover boss 35 located oppositely are provided on the face opposite to the inner plate rotating shaft spring 42, and when the inner plate rotating shaft spring 42 opens the inner support plate 22, the inner plate boss 47 rotates with the inner support plate 22, and when the inner plate rotating shaft spring 42 opens to a certain angle, the inner plate boss 47 will be brought into contact with the cover boss 35 so that the angle between the inner support plate 22 and the cover support plate 21 is fixed. In order to make the support structure be more stable, the angle between the inner support plate 21 and the cover support plate 22 is less than 90°, preferably 60°.

When the entire support structure is closed, the cover support plate 21 is automatically tightened due to the direction in which the cover rotating shaft spring 32 generates the force toward the rear housing 1, and when the support structure is opened, the cover support plate 21 is pulled apart, the inner support plate 22 automatically opens up by the force of the inner plate rotating shaft spring 42, and stops when the inner plate boss 47 comes into contact with the cover boss 35, and the inner support plate 22 automatically bounces out during the entire opening process, which forms a stable triangular support with the cover support plate 21 and the rear housing 1 without manual assistance.

Figure 8:
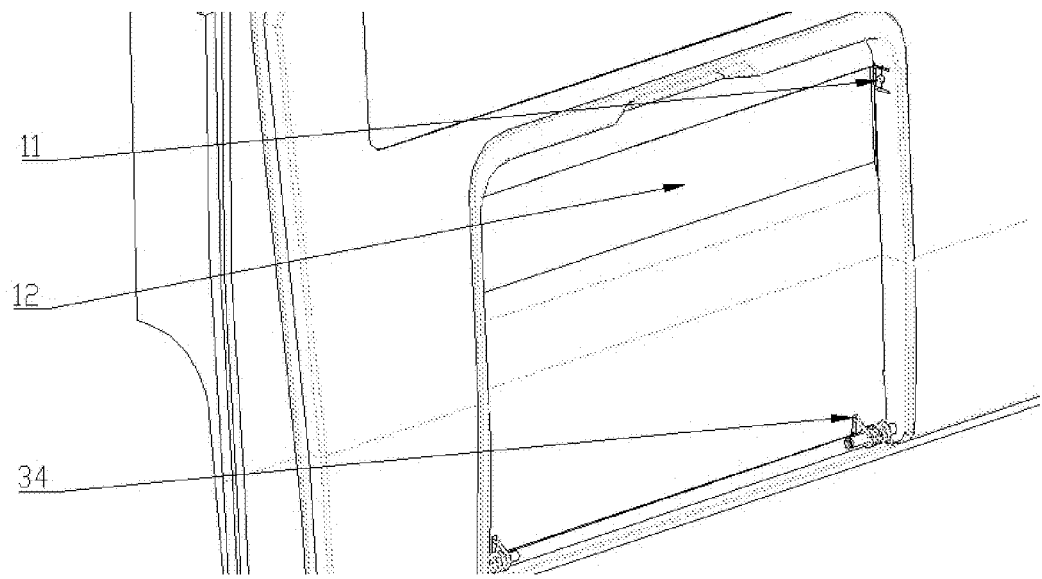
FIG. 8 is a schematic view showing the rear housing structure of the support structure of the optical time domain reflectometer according to the present invention.

As shown in FIG. 8, the rear housing 1 is provided with a support accommodation point 12 recessed in the rear housing 1, and when the support structure is open, the support accommodation point 12 is used to accommodate one end of the open inner support accommodation point 22, and specifically, after the inner support plate 22 is opened, the inner plate rotating shaft spring 42 causes the inner support plate 22 to be lifted upwardly and the lifted side falls into the support accommodation point 12. At this time, the cover support plate 21, the inner support plate 22, and the plane where the support accommodation point 12 on the rear housing 1 is located form a complete support structure.

The cover support plate 21 is provided with a cover side boss 211 which is disposed perpendicular to the plane of the cover support plate 21 and higher than the cover support plate 21, and preferably, the number of the cover side boss 211 is two and are respectively provided on two opposite sides of the cover support plate 21. When the support portion 2 is engaged with the rear housing 1, the cover side boss 211 will be integrated closely with the support accommodation point 12. Specifically, when the support structure is engaged, since the support accommodation point 12 is recessed in the rear housing 1, the cover side boss 211 protrudes to the support accommodation point 12 and is integrated closely with the support accommodation point 12 so that the entire support structure is well sealed and the strength of the cover support plate is increased.

Figure 7:
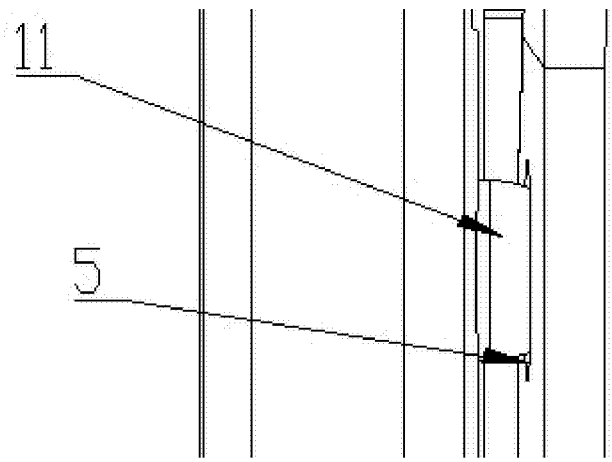
FIG. 7 is a partial enlarged structure drawing of FIG. 6.

As shown in FIG. 7, the cover support plate 21 and the rear housing 1 are provided with a snap-fit stop 5 and/or a snap-fit stop boss 11 respectively, and below only the position of the preferred snap-fit stop 5 and the snap-fit stop boss is described as an example, and the reverse and other methods for realizing the same function are also within the scope of the present invention and will not be described here.

The cover support plate 21 is provided with a snap-fit stop 5 recessed in the cover support plate 21, and the rear housing 1 is provided with a snap-fit stop boss 11. When the cover support plate 21 is engaged with the rear housing 1, the snap-fit stop 5 will be caught with the snap-fit stop boss 11. The cover side boss 211 is provided on the cover support plate 21, so that the position of the snap-fit stop 5 can be also provided on the cover side boss 211. Similarly, the snap-fit stop 5 and the snap-fit stop boss 11 are acted to engage the cover support plate 21 with the rear housing 1 so that the position of the snap-fit stop 5 and the snap-fit stop boss 11 may be provided at any position where the cover support plate 21 is in contact with the rear housing 1, and the present invention is not limited thereto.

As shown in FIG. 6, the cover support plate 21 is externally provided with a non-slip portion 6, which is preferably a kind of non-slip rubber. Specifically, when the cover support plate 21 is opened, the non-slip rubber provided outside the cover support plate 21 is brought into contact with the plane where it is placed, and at this time, the non-slip rubber can prevent the optical time domain reflectometer from being displaced on the plane where it is placed.

The inner support plate 22 is provided with a plurality of reinforcing ribs 7 for reinforcing the strength of the inner support plate 22, and the reinforcing rib 7 is provided inside the inner support plate 22 and protrudes from the inner support plate 22. In the present invention, the reinforcing rib 7 is preferably set to four.

Embodiment 2

The second embodiment of the present invention relates to a support structure for an optical time domain reflectometer, having the substantially same structure as in Embodiment 1, except that the inner support plate 22 is connected to the rear housing 14 through the inner plate rotating shaft portion 4.

Specifically, the inner plate rotating shaft inner sleeve is provided on the inner support plate 22, the inner plate rotating shaft outer sleeve is provided on the rear housing 1, and the inner plate rotating shaft goes through the inner plate rotating shaft inner sleeve and the inner plate rotating shaft outer sleeve.

Preferably, the direction of the force of the cover rotating shaft spring and the inner plate rotating shaft spring in the natural state is kept unchanged. That is to say, the natural state of the cover rotating shaft spring is a tightened state in which the direction of contracting force is to bring the cover support plate 21 into close contact with the rear housing 1; the natural state of the inner plate rotating shaft spring is an open state in which the direction of tension is to bring the inner support plate 22 away from the rear housing 1. When the support structure is closed, the contracting force of the cover rotating shaft spring in the natural state causes the cover support plate 21 to adhere to the rear housing and wrap the inner support plate 22; when the support structure is opened, the tension of the inner plate rotating shaft spring in the natural state causes the inner support plate 22 to keep away from the rear housing 1. Preferably, the cover support plate 21 is provided with a slot parallel to the cover rotating shaft portion and the end of the inner support plate 22 away from the rear housing 1 falls into the slot of the cover support plate 21. The inner support plate 22 and the cover support plate 21 are biased in two different directions so that the rear housing 1 with the cover support plate 21 and said inner support plate 22 form a solid triangular support structure.

It also can be understood that the direction of force of the cover rotating shaft spring may also bring the cover support plate 21 away from the rear housing 1. At this time, the cover support plate is provided with an inner and outer sleeve structure similar to the inner plate rotating shaft inner sleeve and the inner plate rotating shaft outer sleeve, for controlling the maximum opening angle of the cover support plate 21. At the same time, the cover support plate 21 and the rear housing 1 are respectively provided with snap-fit devices corresponding to each other so that the cover support plate 21 and the rear housing 1 can be firmly engaged with each other when the support structure is closed. When the snap-fit device is opened, the support structure will be automatically opened.

The above has described in detail with respect to the specific embodiments of the present invention. It will be apparent to those skilled in the art that various modifications and adaptations may be made to the present invention without departing from the principles of the invention, which are also intended to be within the scope of the appended claims.

What is claimed is:

1. A support structure for an optical time domain reflectometer, comprising:
    a rear housing and a support portion, wherein:
    the support portion comprises a cover support plate and an inner support plate;
    the cover support plate is connected to the rear housing through a cover rotating shaft portion, and
    the inner support plate is connected to the cover support plate or the rear housing through an inner plate rotating shaft portion, while the rear housing forms a solid triangular support structure with the cover support plate and the inner support plate,
    wherein the cover rotating shaft portion and the inner plate rotating shaft portion are provided on the cover support plate and/or the rear housing, and the cover rotating shaft portion is parallel to the inner plate rotating shaft portion.

2. The support structure for the optical time domain reflectometer according to claim 1, wherein
    the cover rotating shaft portion comprises a cover rotating shaft and a cover rotating shaft spring, among which, one end of the cover rotating shaft spring comes in contact with the rear housing, while the other end comes in contact with the cover support plate; the inner plate rotating shaft portion comprises an inner plate rotating shaft, an inner plate rotating shaft spring, an inner plate rotating shaft inner sleeve, and an inner plate shaft outer sleeve, among which, one end of the inner plate rotating shaft spring comes in contact with the cover support plate or the rear housing, while the other end comes in contact with the inner support plate, and the inner plate rotating shaft inner sleeve is provided on the inner support plate, the inner plate rotating shaft outer sleeve is provided on the cover support plate or the rear housing, and the inner plate rotating shaft goes through the inner plate rotating shaft inner sleeve and the inner plate rotating shaft outer sleeve.

3. The support structure for the optical time domain reflectometer according to claim 2, wherein
the natural state of the cover rotating shaft spring is a tightened state in which the direction of contracting force is to bring the cover support plate into close contact with the rear housing, and the natural state of the inner plate rotating shaft spring is an open state in which the direction of tension is to bring the inner support plate away from the cover support plate or the rear housing.

4. The support structure for the optical time domain reflectometer according to claim 2, wherein
the inner plate rotating shaft portion further comprises an inner plate boss provided at one side of the inner rotating shaft inner sleeve and a cover boss provided at one side of the inner rotating shaft outer sleeve, and
when the inner support plate is opened, the inner plate boss is brought into contact with the cover boss so that the angle between the inner support plate and the cover support plate, or between the inner support plate and the rear housing is less than 90°.

5. The support structure for the optical time domain reflectometer according to claim 4, wherein
the cover rotating shaft portion further comprises a cover spring stop provided on the cover support plate and a rear housing spring stop provided on the rear housing, and the cover spring stop and the rear housing spring stop are used to accommodate the cover rotating shaft spring.

6. The support structure for the optical time domain reflectometer according to claim 5, wherein
the inner plate rotating shaft portion further comprises an inner plate spring stop provided on the inner support plate and protruding the inner support plate, and an inner plate spring accommodation stop provided on the cover support plate or the rear housing and recessed in the cover support plate or the rear housing;
the inner plate rotating shaft penetrates through the inner plate rotating shaft spring.

7. The support structure for the optical time domain reflectometer according to claim 6, wherein
the rear housing is provided with a support accommodation point recessed in the rear housing, when the support structure is opened, the support accommodation point accommodates one end of the inner support plate.

8. The support structure for the optical time domain reflectometer according to claim 7, wherein
the cover support plate and the rear housing are respectively provided with a snap-fit stop and/or a snap-fit stop boss, when the support portion is engaged with the rear housing, the snap-fit stop will be caught with the snap-fit stop boss.

9. The support structure for the optical time domain reflectometer according to claim 8, wherein the cover support plate is provided with a cover side boss, when the support portion is engaged with the rear housing, the cover side boss will be integrated closely with the support accommodation point.

10. The support structure for the optical time domain reflectometer according to claim 9, wherein
the cover support plate is externally provided with a non-slip portion.

11. The support structure for the optical time domain reflectometer according to claim 10, wherein
the inner support plate is provided with a plurality of reinforcing ribs.

12. An optical time domain reflectometer comprising a support structure according to claim 1.

* * * * *